Feb. 16, 1926.                         1,573,561
S. MANNING
LUBRICATING APPARATUS
Filed July 30, 1923          2 Sheets-Sheet 1
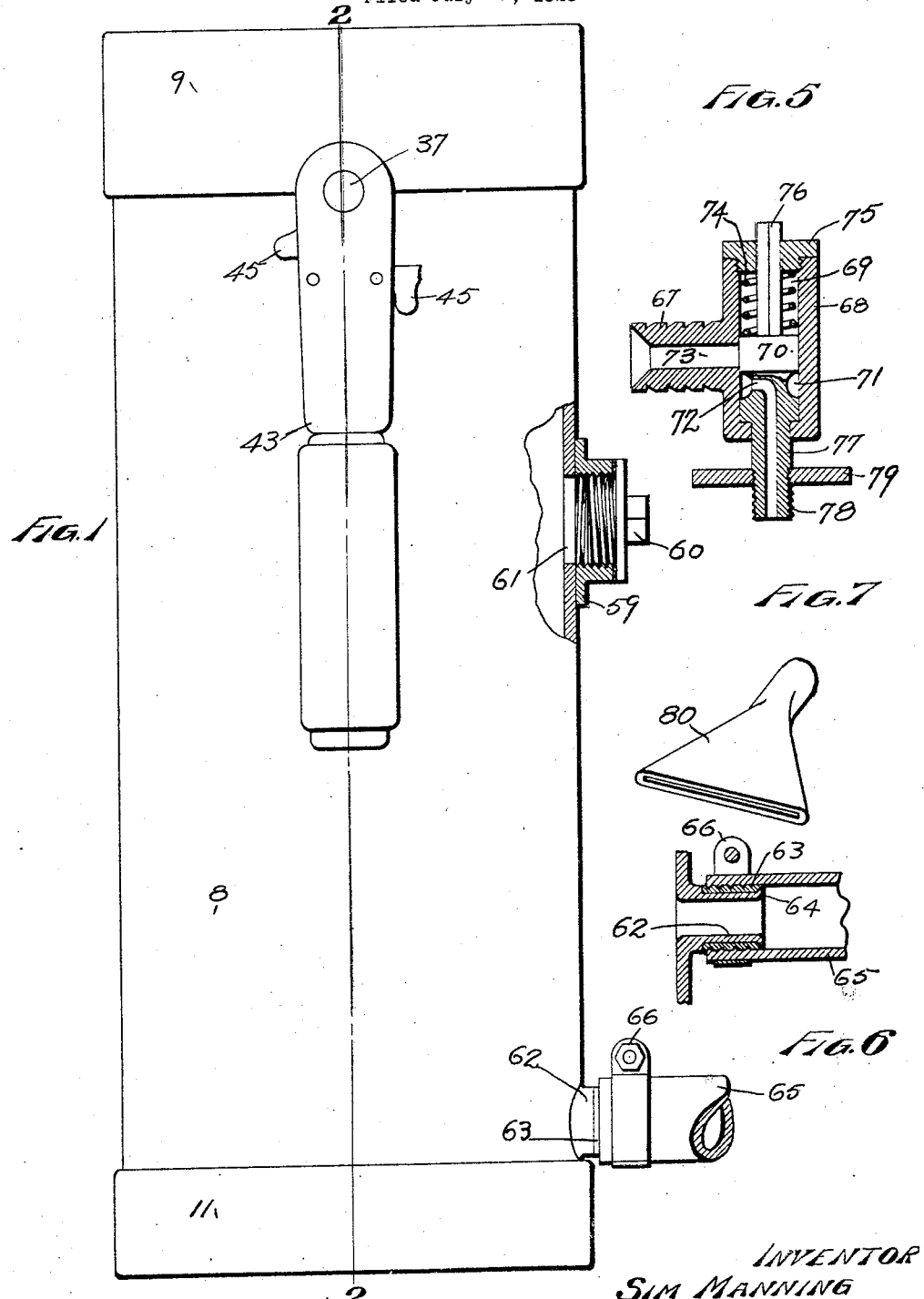

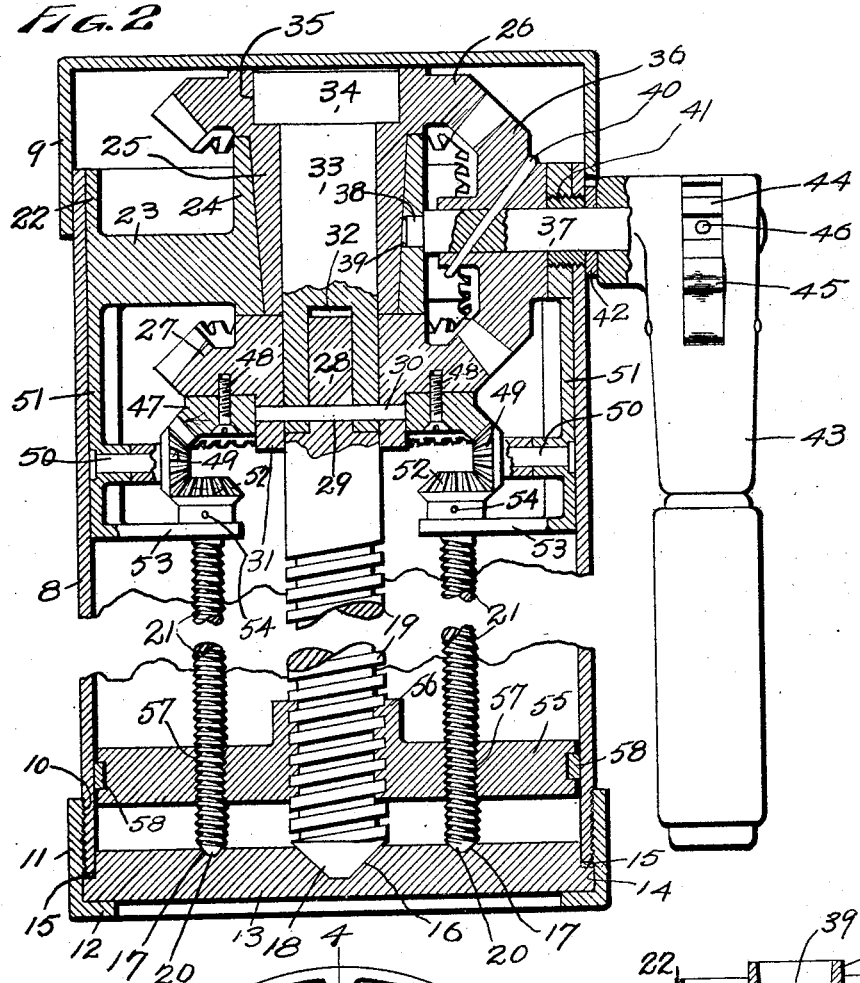

Patented Feb. 16, 1926.

1,573,561

UNITED STATES PATENT OFFICE.

SIM MANNING, OF ST. LOUIS, MISSOURI, ASSIGNOR OF ONE-THIRD TO RICHARD WILLIS, OF ST. LOUIS, MISSOURI.

LUBRICATING APPARATUS.

Application filed July 30, 1923. Serial No. 654,590.

*To all whom it may concern:*

Be it known that I, SIM MANNING, a citizen of the United States, and resident of the city of St. Louis and State of Missouri, have invented certain new and useful Improvements in Lubricating Apparatus, of which the following is a specification containing a full, clear, and exact description, reference being had to the accompanying drawings, forming a part thereof.

My invention relates to improvements in lubricating apparatus and has for its primary object an apparatus designed to force heavy lubricant under pressure to the surfaces to be lubricated.

A further object is to construct a lubricating apparatus whereby grease cups can be readily filled either with a solid or semisolid lubricant.

A still further object is to construct a lubricating apparatus in which heavy oils or greases can be placed under pressure and delivered to lubricant receptacles quickly and without the person operating the device becoming soiled. Heretofore, in filling grease cups and similar lubricant reservoirs either with solid or semi-solid greases, it has been necessary to use a spatula to force the lubricant into a cup. This operation was naturally very greasy and necessitated, as a general rule, the use of overalls or other special clothing. By the use of my apparatus the lubricant is placed under pressure and forced in and does not necessitate any change of clothes for lubricating a machine. This makes my device especially applicable to motor vehicles because formerly it was necessary for the person doing the greasing to crawl underneath the car with a can of grease and work the same into the proper cup or receptable by means of a knife or similar article.

In the drawings:—

Fig. 1 is a side elevation of my device with portions broken away and in section;

Fig. 2 is a vertical section taken on the line 2—2 of Fig. 1 with parts broken away;

Fig. 3 is a bottom plan view of the gear supporting frame made use of;

Fig. 4 is a sectional view taken on the line 4—4 of Fig. 3 showing the same on a reduced scale;

Fig. 5 is a vertical section of the valve employed;

Fig. 6 is a fragmental section showing the method of securing the conduit to the lubricator; and Fig. 7 is a perspective view of the spray lubricating nozzle.

In the construction of my device I employ a lubricator which consists of a cylindrical casing 8. The cylindrical casing is provided with a cover 9 on its upper end. The lower end of the casing 8 is provided with screw threads 10 over which a ring 11 is designed to be secured. The ring 11 is provided with an inturned flange 12, which flange contacts with the bottom 13. The bottom 13 is provided with a shoulder 14 on which a gasket 15 is placed. The gasket 15 is to prevent any leakage of oil. The bottom 13 is also provided with recesses 16 and 17. In the recess 16 is seated the end 18 of the screw 19, while in the recesses 17 are seated the ends 20 of screws 21. The purpose of these screws will be explained in detail later. Located within the cylindrical member 8 is a gear supporting frame consisting of a circular member or sleeve 22. This sleeve has integrally formed ribs 23 which support a central bearing 24. This bearing has a tapered opening extending therethrough in which the tapered hub 25 of the bevel gear 26 is seated. Located beneath the bearing 24 is a bevel gear 27 into which the screw 19 passes. The screw 19 has its upper portion cut away on both sides leaving a flat portion 28 through which an opening 29 is formed. This opening permits the passage of the pin 30. The pin 30 passes through the hub 31 of the gear 27 and also through the bifurcation 32 of the stud 33 which passes through the gear 26. This stud is provided on its upper end with a head 34 which enters the recess 35 in the gear 26, and when the stud is thus secured there is no possibility of the gears 26 and 27 from being forced apart. Meshing with the gears 26 and 27 is a gear 36 which is mounted on a shaft 37. The shaft 37 has its end 38 reduced in diameter so as to fit within the opening 39 formed in the bearing 24. The gear 36 is held on the shaft 37 by means of a pin or similar fastening means 40. The cylindrical member 8 as well as the gear supporting frame is provided with a screw threaded opening in which a screw threaded sleeve 41 is secured. This holds the gear supporting frame within the cylindrical member 8. The screw threaded sleeve 41 permits the passage of the shaft 37 on the outside of the cylindrical member. Surrounding the shaft 37 is located a washer or sleeve 42 against which a handle 43 rests. The handle is provided with a ratchet wheel 44 and dogs 45. The dogs are pivotally mounted in the handle 43 and the ratchet wheel is secured to the shaft 37 by means of the pin 46. It will be noted from Fig. 1 that the handle 43 carries two dogs. The purpose of this is to enable the operator to turn the shaft 37 in either direction, thus controlling the rotation of the screw 19.

Secured to the bevel gear 27 is a bevel gear 47. This gear is secured by means of screws 48 in a manner to be described later. The gear 47 meshes with double gears 49. These gears are mounted on studs 50 which are carried by projections or arms 51 formed integral with the gear supporting frame. The gears 49 in turn mesh with gears 52. These gears rest on projections or ears 53 which extend at right angles and are integral with the projections 51 and through these ears the screws 21 extend. These screws project into the gears 52 and are secured thereto by means of pins or other fastening means 54.

Located in the cylindrical member is a piston 55 which is provided with a central screw threaded opening 56 through which the screw 19 passes. The piston 55 is also provided with screw threaded openings 57 through which the screws 21 pass. And in order to make a leak tight joint between the wall of the cylindrical member 8 and the piston 55 I employ a piston ring 58. Secured to the wall of the cylindrical member 8 is a screw threaded flange 59 which is provided with a closure 60. This screw threaded flange registers with an opening 61 formed in the wall of the chamber and is for the purpose of introducing the lubricant. Adjacent the lower end of the cylindrical member 8 is a tubular projection 62 which is formed integral with the member 8. Over this projection is placed a sleeve 63. After the sleeve 63 has been placed in position the end 64 of the tubular member is flared as in Fig. 6. This prevents the sleeve 63 from slipping from the projection but at the same time permits its rotation so that when the flexible conduit 65 is secured on the sleeve by means of the clamp 66, the conduit can be turned without danger of kinking or becoming twisted.

Secured in the conduit 65 by any well known means is the end 67 of the lubricating nozzle. The lubricating nozzle consists of a cylindrical portion 68 which is formed integral with the portion 67 and which is provided with a chamber 69 in which the valve 70 is mounted. The valve 70 is provided with a circumferential groove 71 into which the lubricant passage 72 opens. The purpose of the groove 71 is to permit the lubricant to enter the passage 72 through the passage 73 formed in the member 67 regardless of the position of the opening 72. The valve is normally held in closed position by means of a spring 74. This spring is secured in position by means of a screw threaded cap 75 through which the stem 76 of the valve passes. This stem prevents any tilting of the valve due to its operation and also permits the operator to assist the spring 74 in forcing the valve into the position shown in Fig. 5. The valve 70 is provided with a nozzle 77 which projects through the cylindrical housing or portion 68. This nozzle is screw threaded as at 78. The purpose of this screw threading is to permit a plate 79 to be secured thereon. This plate is intended to operate the valve 70 and place it in working position.

When it is desired to use the device for lubricating vehicle springs, the nozzle or tip 80 is secured on the screw threaded portion adjacent the plate 79. This causes the lubricant to issue from the nozzle in a flat thin stream instead of a relatively thick round stream, which would be the case when the nozzle 80 is not used.

The method of assembling my device and its operation is as follows:—

In assembling my device the gear 26 is first placed in the supporting frame, the stud 33 is then placed in position, the gear 27 is then placed over the stud. The gear 47 is now placed within the supporting frame and rests on the ears 53. The next step is to insert the screw 19 and then insert the pin 30. This binds the gears 26 and 27 and the stud 33 and screw 19 solidly together. The gear 47 is then raised upward so as to fit over the hub 31 of the gear 27 and the screws 48 inserted. By this arrangement the pin 30 is prevented from shifting when in place. The screws 21 are now inserted through the opening 57 in the head or piston 55 and screwed down a considerable distance. After this, the screw 19 is inserted through the head. The next step is to place the gears 49 in position and insert the pins or studs 50. After this the gears 52 are placed in position on the ears 53. The screws 21 are now raised or screwed upward from the head 55 until they enter the gears 52, after which the pins 54 are inserted which secure the gears and screws together. The piston ring 58 is then placed in position and the assembled apparatus inserted in the cylindrical casing 8. The gear supporting frame 22 is then pushed down far enough to allow the sleeve 41 to be inserted. After this, the gear 36 is placed in position and the shaft 37 inserted through the gear. When this is finished the pin 40 is driven home, thus securing the gear 36 and the shaft 37 together. Then the washer 42 is placed in position and finally the handle 43. The handle is secured by means of the pin 46 which secures the ratchet 44 on to the shaft 37. The pins 50 as will be noted from Fig. 2, are provided with heads, which contact with the inner wall of the cylindrical member 8, and which heads prevent the pins from moving inward. In this way the gears 49 are securely held in position. After the device has been thus far assembled, the bottom 13 is placed in position so that the screws 21 will rest in the recesses 17 and the screw 19 in the recess 16. These recesses are for the purpose of providing a bottom bearing for the screws so that the piston will not bind due to the screws wobbling. After the bottom has been placed in position, the ring 11 is tightened. The flange 12 bears against the bottom, while the gasket 15 together with the flange 14 makes a leak tight joint. The flexible conduit has its one end then attached to the casing, the other end of the conduit carries the nozzle.

The filler opening 60 is so located as to be below the piston 55 when the same is raised to its fullest extent so that any lubricant introduced into the cylinder will be below the piston.

In operating my device the piston 55 is first raised to its uppermost position. This is done by means of the handle and ratchet arrangement. The plug 60 is then removed and lubricant placed in the cylinder. The operation of the ratchet is then reversed and the piston forced downward coming in contact with the lubricant and placing the same under pressure. After this has been done, the device is ready for greasing purposes and in order to fill a grease cup, all that is necessary is to remove the cap of the cup and introduce the nozzle into the cup. Then by a downward pressure of the nozzle the plate 79 is brought in contact with the upper edge of the cup. A continued pressure raises the valve 70 and allows lubricant to be forced out through the nozzle 77 and into the cup. When the cup is full, it is only necessary to remove the nozzle from the cup and the spring 74 will seat the valve and prevent the escape of lubricant. In this way it is not necessary to come in contact with the lubricant at all and it is possible to grease a motor vehicle in a very short time.

When it is desired to use my device for oiling springs, the spray nozzle or tip 80 is attached and then the plate 79 is gripped with the fingers and pulled upwardly thus permitting lubricant to flow from the nozzle and on to the spring in a flat sheet instead of a round stream.

My purpose in swivelly mounting the conduit 65 on the cylinder 8 is to permit the conduit to be turned so that the nozzle can be readily inserted in an oil cup regardless of its position. This turning is also essential in the greasing of springs. If the conduit were not so mounted, the same would have to be twisted, which in a short time would cause it to weaken and leak.

My device is especially applicable for motor vehicles in filling grease cups, transmission and differential casings either with hard or semi-hard grease or with heavy oils and can also be used to advantage in greasing springs because a heavy oil can be forced from the nozzle under sufficient pressure to enable it to enter freely between the leaves of the spring and thus accomplish a very thorough lubrication.

My device can be so constructed as to be mounted either on the dash-board of an automobile underneath the hood, or it can be carried in the tool box. It can also be made large enough to contain oils and grease for service stations.

While I have shown my device as having the pressure mechanism hand operated, still it is obvious that by very slight changes in construction, the same can be power driven. In fact the power driven device is preferable for large lubricators. This different driving power mechanism however, is obvious and therefore is not shown or described in detail.

One of the essential points in my device is the screws 21 which prevent the turning of the piston 55. These screws are so threaded and geared as to have the same ratio of feed as the screw 19. This is very essential in the operation of my device because if the screws did not all feed at the same rate, it would be impossible to move the piston either up or down without stripping threads. My purpose of using screws 21 is that there will be less leakage of a thin lubricant under pressure past the screw threads than would be possible were smooth shafts used, although if found desirable a smooth shaft with a packing gland could be used, and in this event the gears 47, 49 and 52 are dispensed with.

By my construction, it is not necessary to use a heavy driving shaft, that is, the shaft 37 can be of relatively small diameter because the gear 26 holds the gear 36 in mesh with the gear 27 and prevents any possibility of the two gears coming out of mesh. The only strain placed on the shaft 37 being a twisting strain in rotating the gear.

Having fully described my invention what I claim is:—

1. A lubricator comprising a casing having a cover and a bottom secured thereto, a piston located within said casing, a sleeve located in said casing adjacent the cover, a plurality of gears located within said sleeve and operatable from without the casing, a screw carried by one of said gears and extending centrally through said piston for raising and lowering the same, screws carried by certain of the remaining gears and extending through said piston for preventing the same from turning, said last mentioned screws having a finer lead than the first mentioned screw and being rotated proportionately faster so that all of said screws have the same rate of feed, a flexible conduit carried by said casing for permitting the discharge of lubricant under pressure therefrom.

2. A lubricator comprising a casing, a cover and a bottom secured thereto, a piston located within said casing, a plurality of gears located within the casing adjacent the cover, a ratchet mechanism located without said casing for operating said gears, a screw carried by one of said gears and extending centrally through said piston for raising and lowering the same, screws carried by certain of said remaining gears and extending through said piston for preventing the same from turning, said last mentioned screws having a finer lead than the first mentioned screw and adapted to be rotated proportionately faster so that all of said screws will feed equally, and a charging opening located in the side of said casing at a point below the piston when the same is raised.

In testimony whereof, I have signed my name to this specification.

SIM MANNING.